May 13, 1952  A. GREENE  2,596,849
ROTATABLE TURN INDICATING SIGNAL
Filed June 8, 1950  2 SHEETS—SHEET 1
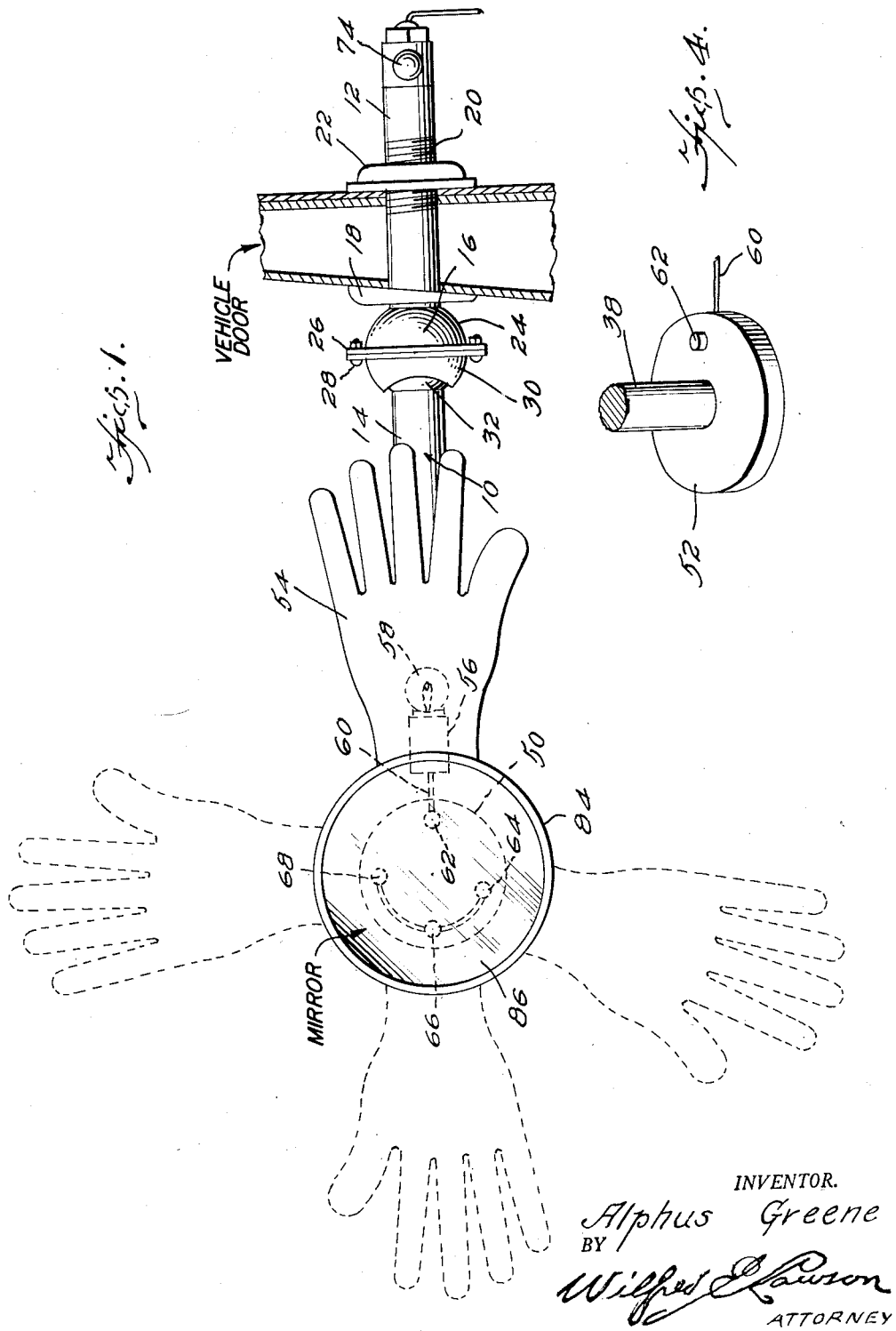
INVENTOR.
Alphus Greene
BY
Wilfred Lawson
ATTORNEY

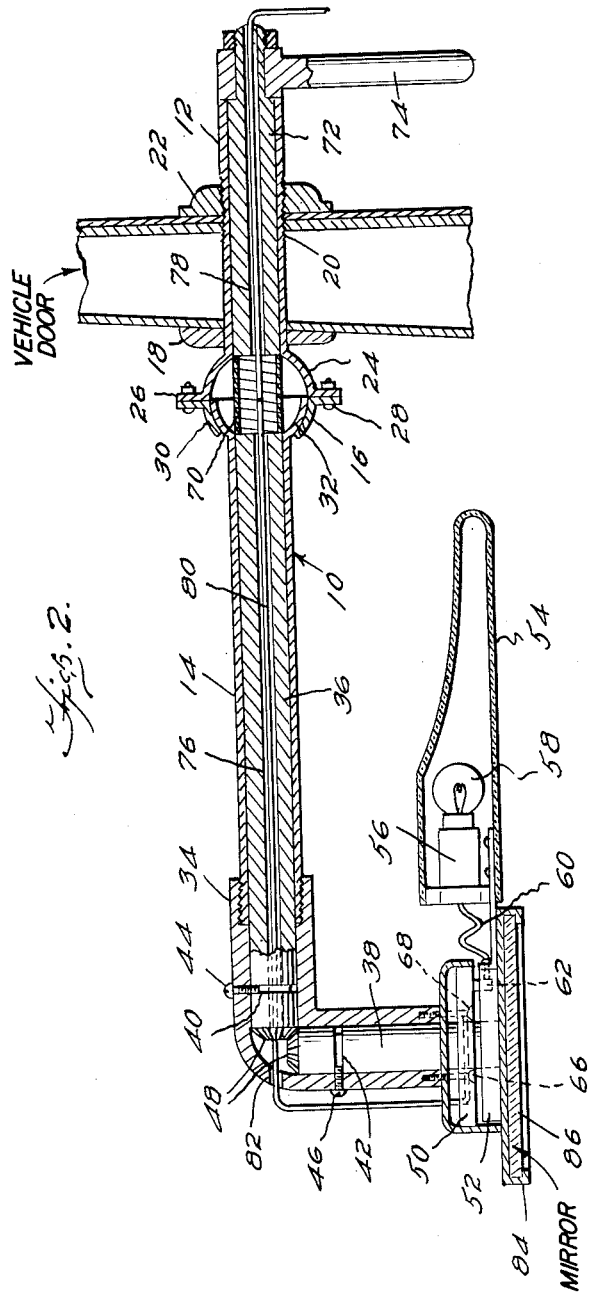
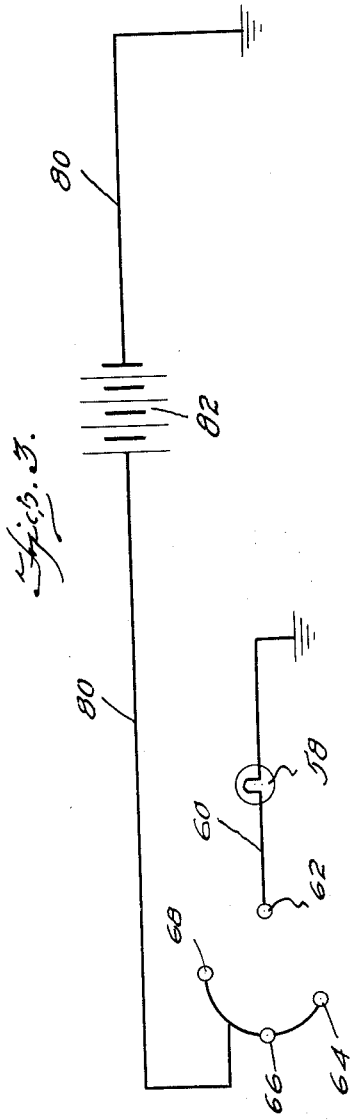

Patented May 13, 1952

2,596,849

UNITED STATES PATENT OFFICE 2,596,849

ROTATABLE TURN INDICATING SIGNAL

Alphus Greene, Twin Falls, Idaho

Application June 8, 1950, Serial No. 166,794

3 Claims. (Cl. 177—327)

This invention relates to a signalling device and more particularly to a direction signal for a motor vehicle.

The primary object of the invention is to enable the driver of a motor vehicle to warn pedestrians or others of his intentions to make a right turn, make a left turn, or come to a stop without resorting to the customary hand signals.

It is well known that in inclement weather and during cold periods the average motorist suffers great discomfort when having to open the window of the vehicle adjacent the driver's seat in order to give the desired warning signals with his hand and arm. As a consequence many drivers neglect to give the proper signals and as a result accidents of varying degrees of seriousness frequently occur.

Another object of this invention is to enable the operator of a vehicle to give the proper warning signals without suffering the inconvenience and discomfort attendant to the use of the hand and arm.

A still further object is to enable the signal to be readily seen both during periods of daylight and darkness.

The above and other objects may be attained by employing this invention which embodies among its features an arm extending through the door of a vehicle and supporting at its outer end an angular extension, shafts extending through the arm and the angular extension and having intermeshing bevel pinions at the junction of the arm and the angular extension, a handle on the shaft adjacent the inner end of the arm for rotating said shaft and an artificial hand carried by the shaft which projects through the angular extension for movement therewith into various signalling positions by the handle.

Other features include illuminating means for the artificial hand; means to couple the illuminating means with a source of energy when the hand is in various signalling positions, and a flexible coupling intermediate the ends of the arm to facilitate its movement into various adjusted positions.

In the drawings:

Figure 1 is a fragmentary sectional view through a vehicle door showing this improved signalling device mounted thereon with certain portions of the device being shown in section, Figure 2 is a sectional view through the vehicle door taken at right angles to Figure 1, and Figure 3 is a wiring diagram illustrating the manner in which electrical energy is conducted to the illuminating means in the artificial hand.

Figure 4 is a perspective view of the rotating disc.

Referring to the drawings in detail an arm designated generally 10 of tubular formation comprises two tubular sections 12 and 14 which are coupled together by a universal coupling designated generally 16. Carried by the tubular section 12 adjacent the coupling 16 is a clamping plate 18, and formed on the tubular section 12 in spaced relation to the plate 18 are external screw threads 20 on which a second clamping plate 22 is threaded for cooperation with the plate 18 in clamping the tubular section 12 to opposite sides of a vehicle door.

Carried by the clamping plate 18 on the outer side thereof is a hemispherical socket member 24 which is provided adjacent its outer end with an outstanding annular flange 26 which is pierced at spaced intervals to receive clamping bolts 28 by means of which a hemispherical clamping socket member 30 is adjustably coupled to the hemispherical socket member 24.

Carried by the section 14 of the tubular arm 10 is a spherical head 32 which is received between the socket members 24 and 30 in order to couple the tubular sections 12 and 14 together and it will be evident that by tightening the bolts 28 which extend through the flanges of the socket members 24 and 30, the pressure of the socket members against the head 32 may be made to hold the tubular section 14 in various adjusted positions relative to the tubular section 12.

Carried by the tubular section 14 adjacent the end thereof remote from the spherical head 22 is a substantially L-shaped fitting 34 is which shafts 36 and 38 are mounted to rotate. These shafts are formed intermediate their ends with annular grooves 40 and 42 respectively, and extending radially into the opposite arms of the fittings are set screws 44 and 46 which enter the respective grooves 40 and 42 to retain the shafts 36 and 38 in place in the fitting. The adjacent ends of the shafts are equipped with intermeshing bevel gears 48 so that when one shaft is rotated, the other will rotate in unison therewith.

Carried on the end of the arm of the L-shaped fitting 34 in which the shaft 38 is rotatably mounted is a head 50 of non-conducting material, and mounted on the shaft 38 adjacent its end remote from the pinions 48 is a disc 52 of non-conducting material which lies immediately adjacent the head 50 as will be readily understood upon reference to the drawings.

Carried by the disc 52 and extending radially therefrom is a hollow artificial hand 54 carrying a conventional socket 56 in which a conventional light bulb 58 is mounted. This socket 56 is connected through the medium of a conventional conductor 60 with a contact 62 which extends parallel with the axis of the disc 52 and bears against the adjacent face of the head 50. Contacts 64, 66 and 68 are carried by the head 50 and are arranged in an arcuate row for engagement by the contact 62 when the artificial hand 54 is in signalling position. In other words when the hand is in stop position, the contact 62 will engage the contact 64 to illuminate the lamp bulb 58 and likewise when the hand is in a position to indicate a left turn, the contact 62 will engage the contact 66.

Upon moving the hand to right turn position, the contact 62 will engage the contact 68 and when the hand is in neutral position the contact 62 bears on the non-conducting surface of the head 50 so that the hand will not be illuminated.

As illustrated, the shaft 36 extends through the tubular section 14 of the arm 10 and is coupled through the medium of a flexible connection 70 with a shaft section 72 which is mounted for rotation in the tubular section 12, and carried by the shaft section 72 adjacent the inner end of the tubular section 12 of the arm 10 is an operating handle 74. In the preferred form of the invention the shaft sections 36 and 72 are provided with aligning longitudinal bores 76 and 78 through which an electrical conductor 80 extends. This conductor projects through an opening 82 in the angular fitting 34 at the junction of the legs thereof and is carried to the contacts 64, 66 and 68 so as to convey electrical energy thereto. The opposite end of the conductor 80 is coupled to a suitable power source 82 which may be the battery or generator of the vehicle upon which the device is used.

If so desired the disc 52 may be equipped with a frame 84 in which a rear vision mirror 86 may be fitted.

In use the device is clamped to the vehicle as previously described by drilling a hole through the door and projecting the tubular section 12 through the opening whereupon the clamping plate 22 is advanced on the threads into clamping engagement with the door. With the device thus in place the conductor 80 is coupled to the power source 82 and upon manipulating the handle 74 it will be evident that the artificial hand 54 may be moved into the various signalling positions, and when in signalling position, the lamp 58 will be illuminated. In this way the signal may be given without requiring that the window of the vehicle be opened.

While in the foregoing there has been shown and described the preferred form of this invention, it is to be understood that minor changes in the details of construction, combination and arrangement of parts may be resorted to without departing from the spirit and scope of the invention as claimed.

I claim:

1. A signalling device for attachment to a vehicle comprising an elongated tubular arm adapted to be extended through a vehicle door, means on the arm for clamping engagement with opposite sides of the door, an angular extension on the outer end of the arm, a head on the angular extension remote from the arm, a shaft mounted in the arm to rotate about the longitudinal axis thereof, a handle on the shaft adjacent the inner end of the arm for rotating said shaft, a shaft mounted in the angular extension to rotate about the longitudinal axis thereof, intermeshing bevel pinions on the shafts adjacent the junction of the angular extension and the arm, a disk carried by the second mentioned shaft adjacent the head, said disk being rotatable with said shaft, and an artificial hand carried by the disk and extending radially therefrom for indicating the intentions of the driver of the vehicle.

2. A signalling device for attachment to a vehicle comprising an elongated tubular arm adapted to be extended through a vehicle door, means on the arm for clamping engagement with opposite sides of the door, an angular extension on the outer end of the arm, a head of non-conducting material on the angular extension remote from the arm, a shaft mounted in the arm to rotate about the longitudinal axis thereof, a handle on the shaft adjacent the inner end of the arm for rotating said shaft, a second shaft mounted in the angular extension for rotation about the longitudinal axis thereof, a disk of non-conducting material mounted on the second mentioned shaft for rotation thereby adjacent the head, intermeshing bevel gears on the shafts adjacent the junction of the angular extension and said arm, an artificial hand carried by the disk and extending radially therefrom, illuminating means carried by the hand, contacts carried by the head and connected to a source of electrical energy, and a contact carried by the disk and connected to the illuminating means, said last named contact engaging the contacts on the head for energizing the illuminating means.

3. A signalling device for attachment to a vehicle comprising an elongated tubular arm adapted to be extended through a vehicle door, means on the arm for clamping engagement with opposite sides of the door, an angular extension on the outer end of the arm, a head on the angular extension remote from the arm, a shaft mounted in the arm to rotate about the longitudinal axis thereof, a handle on the shaft adjacent the inner end of the arm for rotating said shaft, a shaft mounted in the angular extension to rotate about the longitudinal axis thereof, intermeshing bevel pinions on the shafts adjacent the junction of the angular extension and the arm, a disk carried by the second mentioned shaft adjacent the head, said disk being rotatable with said shaft, an artificial hand carried by the disk and extending radially therefrom for indicating the intentions of the driver of the vehicle, and a ball and socket coupling intermediate the ends of the arm on the outer side of the vehicle door.

ALPHUS GREENE.

REFERENCES CITED

The following references are of record in the file of this patent:

UNITED STATES PATENTS

| Number | Name | Date |
| --- | --- | --- |
| 1,463,650 | Heagerty | July 31, 1923 |
| 1,627,625 | Tuthill | May 10, 1927 |
| 1,732,794 | Bersaques | Oct. 22, 1929 |
| 2,014,473 | Guttmann | Sept. 17, 1935 |